UNITED STATES PATENT OFFICE.

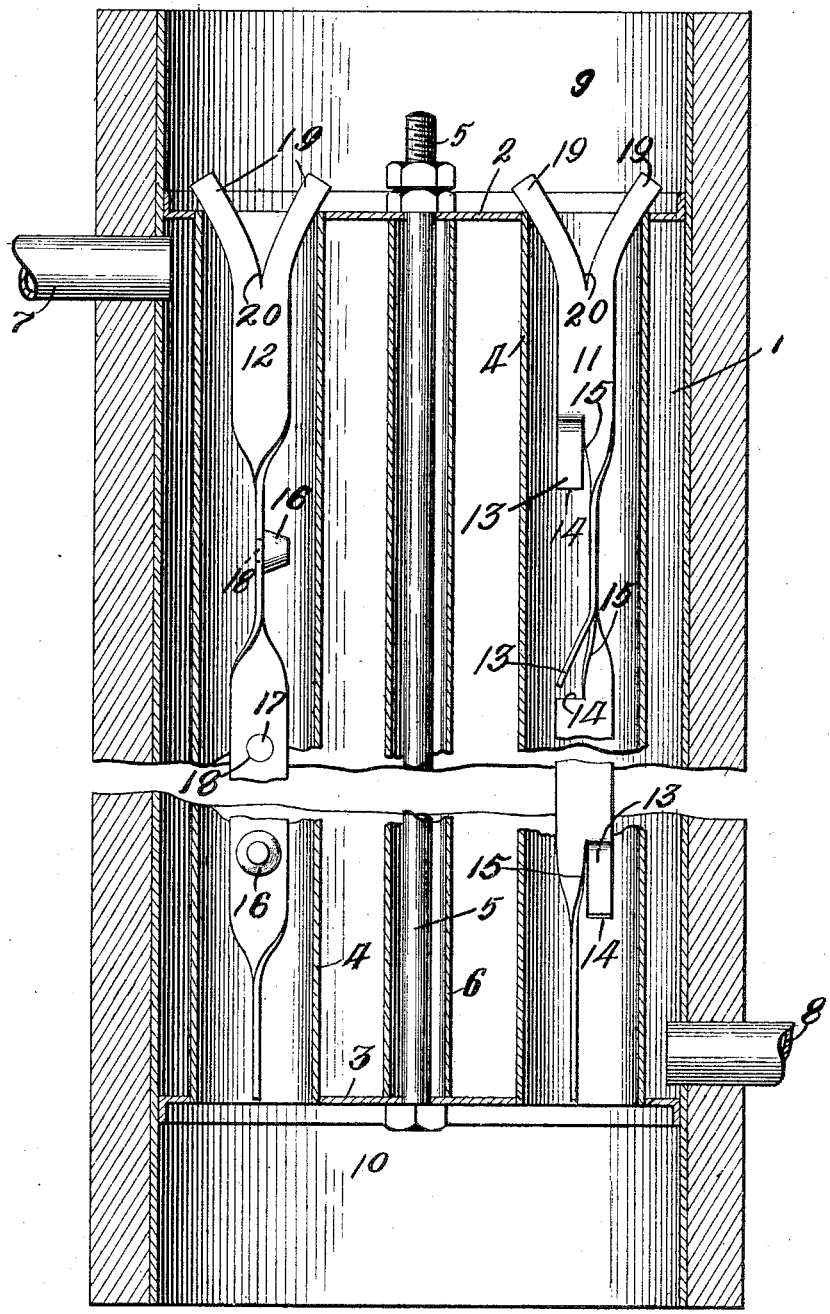

AUGUST J. KOEGLER, OF MILWAUKEE, WISCONSIN.

AGITATOR FOR GRAIN-HEATERS.

971,048. Specification of Letters Patent. Patented Sept. 27, 1910.

Application filed May 12, 1910. Serial No. 560,799.

*To all whom it may concern:*

Be it known that I, AUGUST J. KOEGLER, a citizen of the United States, residing at Milwaukee, county of Milwaukee, and State of Wisconsin, have invented new and useful Improvements in Agitators for Grain-Heaters, of which the following is a specification.

My invention relates to improvements in that class of devices which are adapted to be used for deflecting and agitating grain as it flows through the vertical steam heated tubes of a grain heater.

The object of my invention is to provide a simple and efficient device by which the grain which might otherwise pass too rapidly through the center of the tube to become properly heated, is forced by this device outwardly against the heated walls of the tube, whereby all of the grain is commingled together and uniformly heated to the desired temperature.

The construction of my invention is further explained by reference to the accompanying drawing, which represents a vertical section of the ordinary grain heater, showing my grain deflecting device or agitator in two tubes of the heater.

Like parts are identified by the same reference numerals.

1 is a steam chamber, from the heads 2 and 3 of which a plurality of grain heating tubes 4 are supported. The heads 2 and 3 are centrally connected and reinforced by the stay rod 5 and rod inclosing tube 6.

7 is an inlet steam duct and 8 is an outlet steam duct.

9 is a grain receiving chamber into which the grain is discharged preparatory to being heated in the tubes 4, and 10 is a discharge chamber into which the heated grain is adapted to flow from said heating tubes, and from which chamber it is lead to the grinding rollers of a mill preparatory to being ground into flour.

The heater, thus far described, is substantially of ordinary construction, and invention is herein predicated more especially upon the construction of the grain deflecting and agitating members 11 and 12.

11 shows the preferred form and 12 the modified form of grain deflecting members. The grain deflecting members 11 and 12 both comprise a long narrow thin strip of sheet metal, which is spirally bent in such a manner as to cause the descending grain to move in a spiral course from the upper to the lower ends of said tubes and said strips are also provided with laterally projecting members by which the grain, which might otherwise pass down through the center of the tubes, is deflected outwardly and thereby brought in contact with the heated walls of the tubes, whereby the flow of the grain is retarded until it becomes thoroughly mixed and uniformly heated.

In the preferred form referred to by the reference numeral 11, the deflecting members 13 are formed by a horizontal cut 14, and a vertical cut 15, when the members 13 are curved outwardly at an angle to the vertical, as shown upon the right in said figure, while by the form of agitator indicated by the reference numeral 12, the vertical strip is provided with a plurality of conical projections 16 which conical projections are provided with cylindrical members 17, which are secured in apertures 18 of said vertical strips by riveting or upsetting the protruding ends of said cylindrical members. Both of said strips are, however, provided with the same spiral curve or twist and the laterally projecting deflecting bearings are arranged to alternate with each other from opposite sides of said strip and said strip is so twisted as to cause said projections to radiate horizontally in all directions, whereby no part of the grain is permitted to descend from the upper to the lower ends of said tubes without being brought in contact with said lateral projections. As a means of suspending the deflecting members 11 and 12 in the vertical tubes, said members are both provided with outwardly diverging arms 19, 19, which arms are formed by the vertical central slit 20, when they are bent outwardly, as shown, so as to bear against the vertical side walls of said tubes, when, owing to their downwardly converging shape, said deflecting members are caused to seek the center of such tubes of their own gravity and are not liable, as they might otherwise be, to hang at one side of the inclosing tubes.

Having thus described my invention, what I claim as new, and desire to secure by Letters Patent, is—

In a grain deflector and agitator for the heating tubes of grain heaters, a spirally curved strip of sheet metal provided with a plurality of integrally formed deflecting members alternating with each other from opposite sides of said strip, said deflecting members being respectively formed from the respective edges of said strip by a single horizontal and vertical slit, and by bending that portion of the metal above the horizontal slit outwardly at an angle to the vertical, and means for suspending said strip centrally from the upper end of a grain heating tube.

In testimony whereof I affix my signature in the presence of two witnesses.

AUGUST J. KOEGLER.

Witnesses:
 JAS. B. ERWIN,
 O. R. ERWIN.